(12) United States Patent
Pedersen et al.

(10) Patent No.: US 7,056,077 B2
(45) Date of Patent: Jun. 6, 2006

(54) TRUCK RESTRAINT

(75) Inventors: Paul Pedersen, Guelph (CA); Jason Fowler, Guelph (CA); Mike Tikal, Guelph (CA)

(73) Assignee: Pentalift Equipment Corporation, Guelph (CA)

( * ) Notice: Subject to any disclaimer, the term of this patent is extended or adjusted under 35 U.S.C. 154(b) by 0 days.

(21) Appl. No.: 10/355,199

(22) Filed: Jan. 31, 2003

(65) Prior Publication Data

US 2003/0170097 A1    Sep. 11, 2003

Related U.S. Application Data

(60) Provisional application No. 60/352,511, filed on Jan. 31, 2002, provisional application No. 60/356,752, filed on Feb. 15, 2002.

(51) Int. Cl.
   *B65G 67/02* (2006.01)
(52) U.S. Cl. .................................................. 414/401
(58) Field of Classification Search ................ 414/396, 414/401, 584
   See application file for complete search history.

(56) References Cited

U.S. PATENT DOCUMENTS

| | | | |
|---|---|---|---|
| 4,127,856 A | 11/1978 | Bickel | |
| 4,146,888 A | 3/1979 | Grunewald et al. | |
| 4,191,503 A | 3/1980 | Neff et al. | |
| 4,208,161 A | 6/1980 | Hipp et al. | |
| 4,264,259 A | 4/1981 | Hipp | |
| 4,267,748 A | 5/1981 | Grunewald et al. | |
| 4,282,621 A | 8/1981 | Anthony et al. | |
| 4,373,847 A | 2/1983 | Hipp et al. | |
| 4,379,354 A | 4/1983 | Hahn et al. | |
| 4,400,127 A | 8/1983 | Metz | |
| 4,443,150 A | 4/1984 | Hahn et al. | |
| 4,472,099 A | 9/1984 | Hahn et al. | |
| 4,488,325 A | 12/1984 | Bennett et al. | |
| 4,553,895 A | 11/1985 | Ellis | |
| 4,589,813 A | 5/1986 | Hagen et al. | |
| 4,634,334 A * | 1/1987 | Hahn et al. | 414/401 |
| 4,664,582 A | 5/1987 | Edmeads | |
| 4,674,941 A | 6/1987 | Hageman | |
| 4,759,678 A | 7/1988 | Hageman | |
| 4,767,254 A | 8/1988 | Kovach et al. | |
| 4,784,567 A | 11/1988 | Hageman et al. | |
| 4,815,918 A | 3/1989 | Bennett et al. | |
| 4,830,563 A | 5/1989 | Yeakle | |
| RE32,968 E * | 6/1989 | Hahn | 414/401 |
| 4,861,217 A | 8/1989 | Erlandsson | |
| 4,865,508 A | 9/1989 | Carlson | |
| 4,915,568 A | 4/1990 | West | |
| RE33,242 E | 6/1990 | Hipp et al. | |

(Continued)

FOREIGN PATENT DOCUMENTS

CA    1158812    12/1983

(Continued)

*Primary Examiner*—James W. Keenan
(74) *Attorney, Agent, or Firm*—John R. S. Orange; Santosk K. Chari; Sean X. Zhang (57) ABSTRACT

A truck restraint has a carriage movable in a vertical direction along a track between a first lowered position and a second operative position. A fluid actuator moves the carriage along the track between the first and second positions. The actuator is operable, with the hook in the first position, to cause relative rotation between the hook and the track so that the hook is moved from a downwardly inclined position to a generally horizontal position, prior to movement from the first position.

11 Claims, 14 Drawing Sheets

U.S. PATENT DOCUMENTS

| | | |
|---|---|---|
| 4,938,647 A | 7/1990 | Erlandsson |
| 4,973,213 A | 11/1990 | Erlandsson |
| 4,988,254 A * | 1/1991 | Alexander ................. 414/401 |
| 5,297,921 A | 3/1994 | Springer et al. |
| 5,388,947 A | 2/1995 | Ancel et al. |
| 5,683,219 A | 11/1997 | Gilles et al. |
| 6,106,212 A | 8/2000 | Hahn |
| 6,113,337 A | 9/2000 | Massey |
| 6,162,005 A * | 12/2000 | Fritz ......................... 414/401 |
| 6,190,108 B1 | 2/2001 | Alexander |
| 6,190,109 B1 | 2/2001 | Bender |
| 6,220,809 B1 | 4/2001 | Hahn |
| 6,238,163 B1 | 5/2001 | Springer et al. |
| 6,318,947 B1 | 11/2001 | Hahn et al. |
| 6,322,310 B1 | 11/2001 | Bender et al. |
| 6,322,311 B1 | 11/2001 | Alexander |
| 6,431,819 B1 | 8/2002 | Hahn |
| 6,488,464 B1 | 12/2002 | Kish |
| 6,726,432 B1 * | 4/2004 | Kish et al. .................. 414/401 |
| 2001/0009640 A1 | 7/2001 | Springer et al. |

FOREIGN PATENT DOCUMENTS

| | | |
|---|---|---|
| CA | 1290511 | 10/1991 |
| CA | 2344537 A1 | 10/2001 |
| WO | WO 00/43303 A1 | 7/2000 |

* cited by examiner

1
TRUCK RESTRAINT

This application claims priority from U.S. Provisional Application Nos. 60/352,511 filed Jan. 31, 2002 and 60/356,752 filed Feb. 15, 2002.

BACKGROUND OF THE INVENTION

1. Field of the Invention

The present invention relates to truck restraints

2. Description of the Prior Art

Truck restraints are used to maintain a trailer in position against a loading dock while it is being loaded or unloaded. Inadvertent movement of the trailer would produce a hazardous situation for the vehicle performing the loading or unloading and therefore it is necessary to ensure that the trailer is maintained in position.

A variety of truck restraints have been purposed including chocks that are positioned automatically in front of the trailer wheels to maintain the vehicle in position. A more common type of restraint utilises a hook secured to the loading dock area and which is elevated to engage the ICC bar provided on trailers. The hook is elevated from a stored position to an engaged position and thus engages the ICC bar to inhibit relative horizontal movement between the dock and the trailer.

U.S. Pat. No. 4,759,678 to Hagemen discloses a truck restraint in which a carriage is mounted on tracks and moved vertically along the tracks by a hydraulic actuator. A hook is carried by the carriage and moved into engagement with the ICC bar as the carriage is moved from its stored to its operative position. In the Hagemen patent, the actuator is mounted vertically but alternative configurations of actuator are shown in U.S. Pat. No. 4,830,563 to Yeakle. In the Yeakle patent, the actuator is inclined to the vertical to allow the restraint to adopt a lower profile whilst still inducing vertical movement of the carriage along the guide tracks. Similar arrangements are shown in U.S. Pat. No. 5,297,921 to Springer and U.S. Pat. No. 4,938,647 to Erlandsson. In each of the above arrangement, the carriage and hook assembly are fixed to the tracks that guide the vertical movement and as such extend upwardly from the dock floor by the extent of the hook. It is not unusual for the dock to be formed at the bottom of an inclined ramp so that the loading dock may be maintained at the floor level of the building of which the loading dock is part, As such, it is desirable that the truck restraint has a minimal profile to avoid interference between the restraint and the ICC bar as the trailer is being positioned against the dock. In each of the above references, the minimum profile is that presented by the height of the carriage and hook and in certain conditions this does result in interference.

It is therefore an object of the present invention to obviate or mitigate the above disadvantages.

SUMMARY OF THE INVENTION

In general terms, a truck restraint having a carriage movable in a vertical direction along a track between a first lowered position and a second operative position. A fluid actuator operable to control movement of the carriage along the track between the first and second positions. The actuator being operable with the hook in the first position to cause relative rotation between the hook and the track whereby the hook is moved from a downwardly inclined position to a generally horizontal position, prior to movement from the first position.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
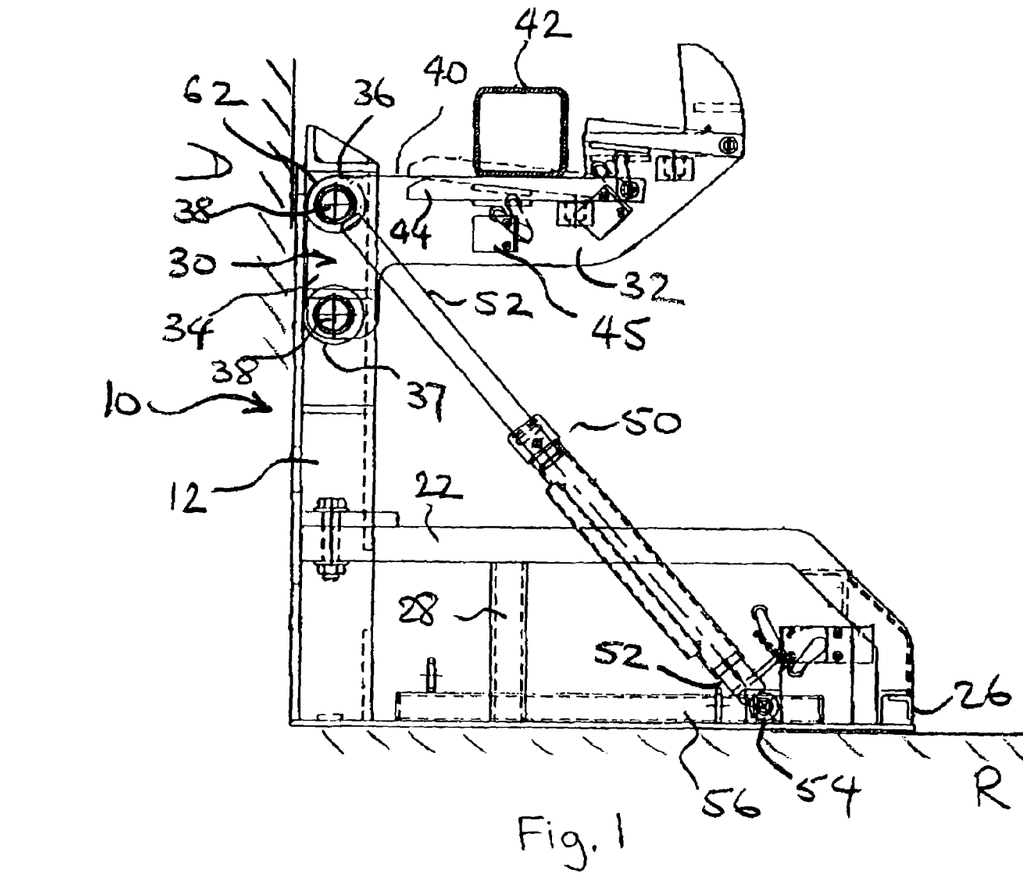
FIG. 1 is a side view of a first embodiment of a truck restraint.
Figure 2:
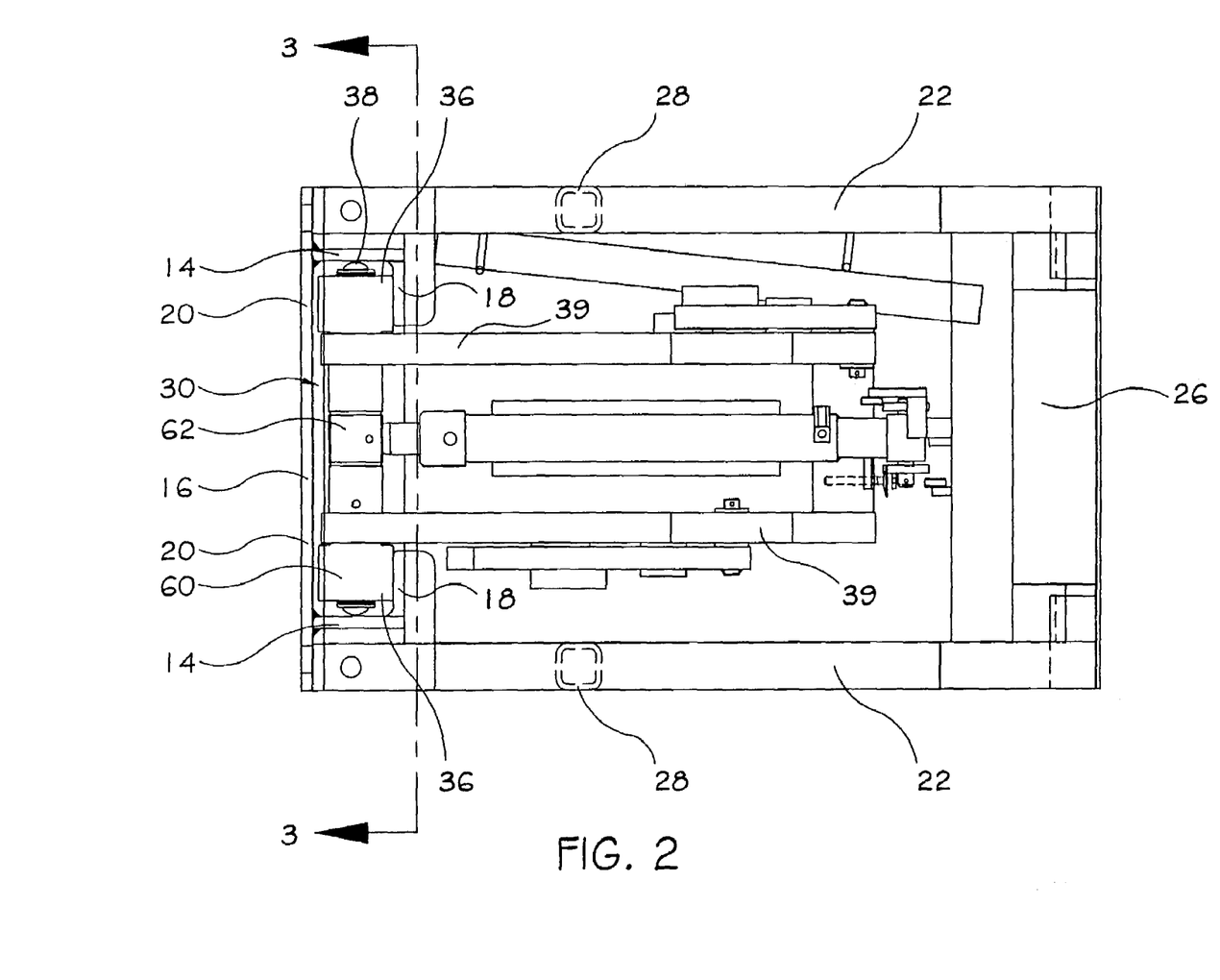
FIG. 2 is a plan view of the restraint shown in FIG. 1.

Referring therefore to FIGS. 1 and 2, a truck restraint generally indicated at 10 is located against the vertical wall D of a loading dock and resting on the roadway R. The truck restraint 10 includes a vertical frame 12 formed from a pair of channel members 14 and cross bracing 16. Each of the channel members 14 has front and rear flanges 18, 20 respectively to define a vertical track.

The vertical frame 12 includes a pair of horizontal rails 22 that extend outwardly from the wall D and are located outboard of the channel members 14. The rails 22 are interconnected at their distal end by lateral frame members 26 and are supported on the road R by legs 28. The rails 22 therefore provide a protective cage extending around components of the truck restraint as will be described further below.

A carriage 30 is provided with a hook 32 that projects from a body 34. The body 34 is located between the channel members 14 and carries pairs of upper and lower vertically spaced rollers 36, 37. The rollers 36, 37 project laterally from the body 34 and are mounted on axles 38 for rotation about a horizontal axis. The rollers 36, 37 have an outer diameter that provides a snug fit within the channels 14 and allows for vertical movement of the carriage 30 relative to the frame 12.

The hook 32 is formed by a pair of laterally spaced plates 39 with a stepped upper surface 40 providing alternate engagement locations for an ICC bar indicated at 42. Signal bars 44 are associated with each of the horizontal steps on the upper surface 40 to provide an indication through limit switches 45 of an engagement with the ICC bar 42.

The movement of the carriage 30 along the channels 14 is controlled by an actuator 50. The head end 58 of the actuator 50 is secured by a pin 54 to a support frame 56 located within the rails 22. The rod end 52 of the actuator 50 is pivotally secured through a bushing 62 to the axle 38 associated with the upper rollers 36. The axle 38 extends across the carriage and thus supports the bushing 60 for pivotal movement on the axis of rotation of the rollers 36 and 37. Extension and retraction of the actuator 50 will thus induce movement of the carriage 34 in the vertical direction along the channels 14.

Figure 3:
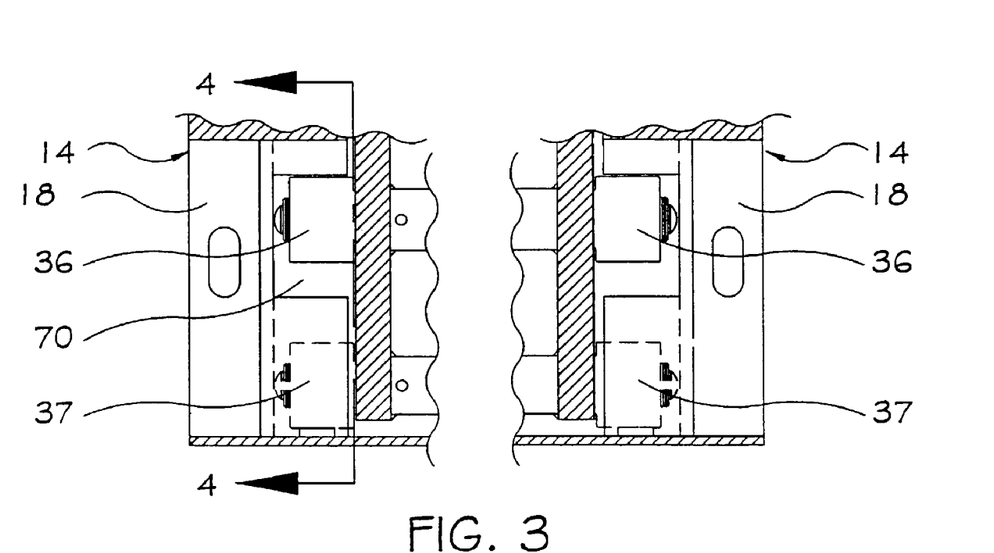
FIG. 3 is a front elevation on an enlarged scale taken on the line 3—3 of FIG. 2.
Figure 4:
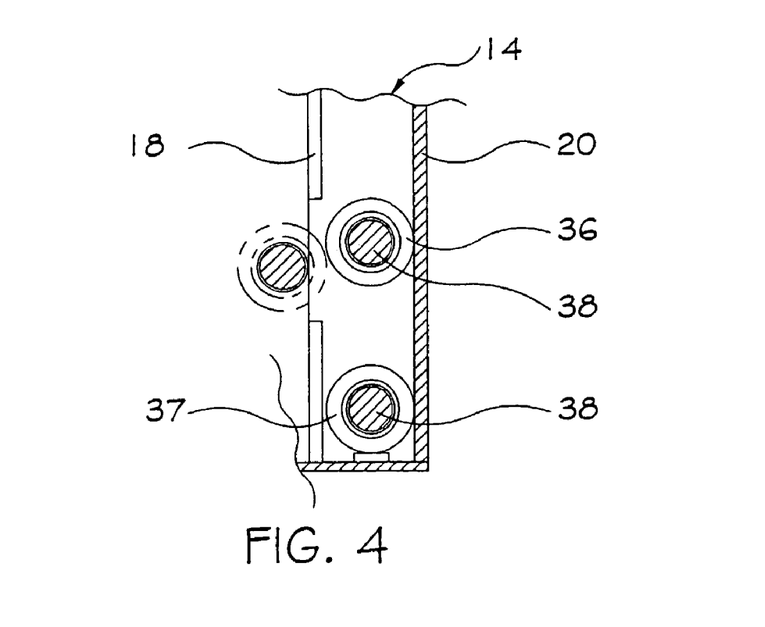
FIG. 4 is a view on the line 4—4 of FIG. 3.

As can best be seen in FIGS. 3 and 4, the forward flange 18 of the channels 14 has a portion thereof removed to define a discontinuity or opening 70. The opening 70 is positioned along the flange 18 at the height of the upper rollers 36 when the carriage 30 is at its vertically lowermost position, that is, the roller 36 is aligned with the opening 70 when the carriage is at the bottom of its travel. The actuator 50 is positioned and selected so that it is not fully retracted with the carriage 30 in the lower most position. The actuator 50 is thus able to retract further and allow a rotation of the carriage 30 about the axle 38 of the lower rollers 37. This permits the top rollers 36 to move forwardly into the openings 70. In this position, the hook 32 is likewise downwardly inclined from its normal horizontal position allowing the distal end of the hook 32 to assume a lower position. The lateral spacing of the plates 39 allows the actuator 50 to be nested within the plates and ensure a minimum profile.

Figure 5:
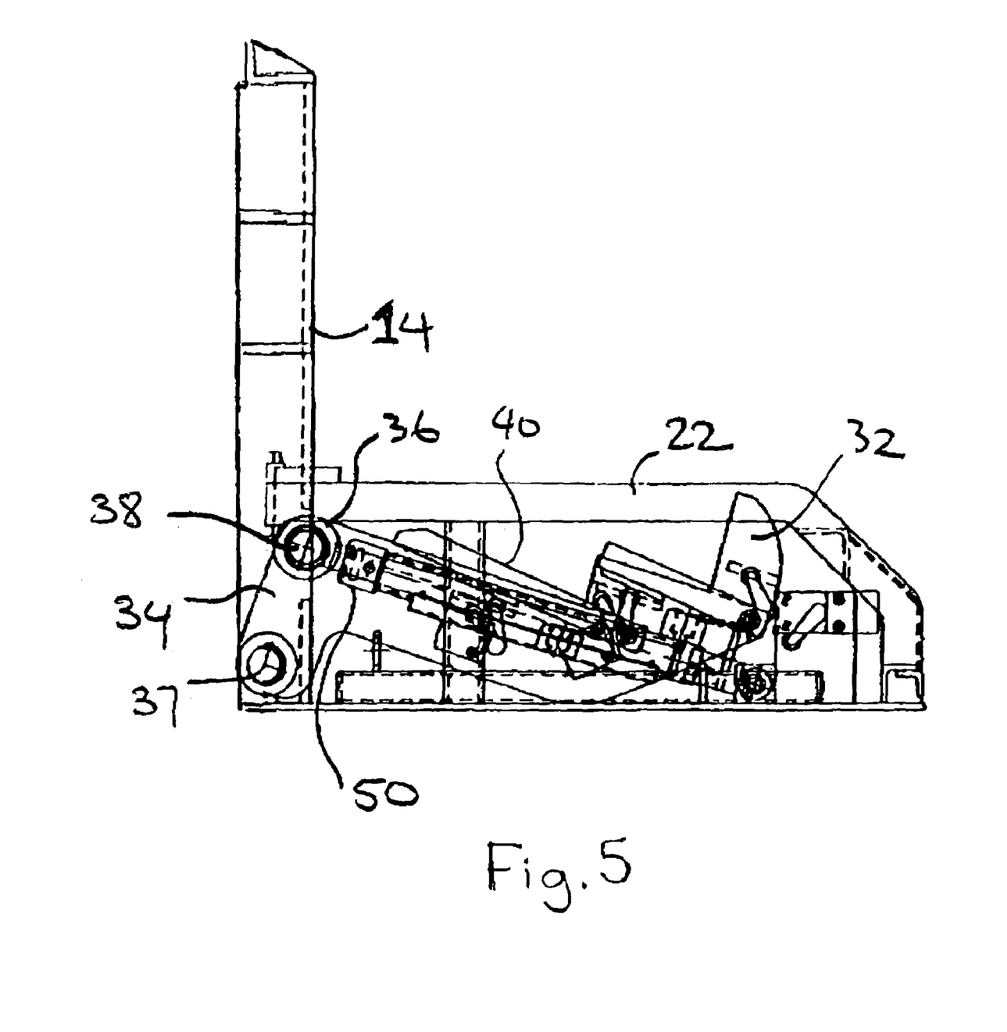
FIG. 5 is a side elevation similar to FIG. 1 showing the restraint in a retracted position.
Figure 6:
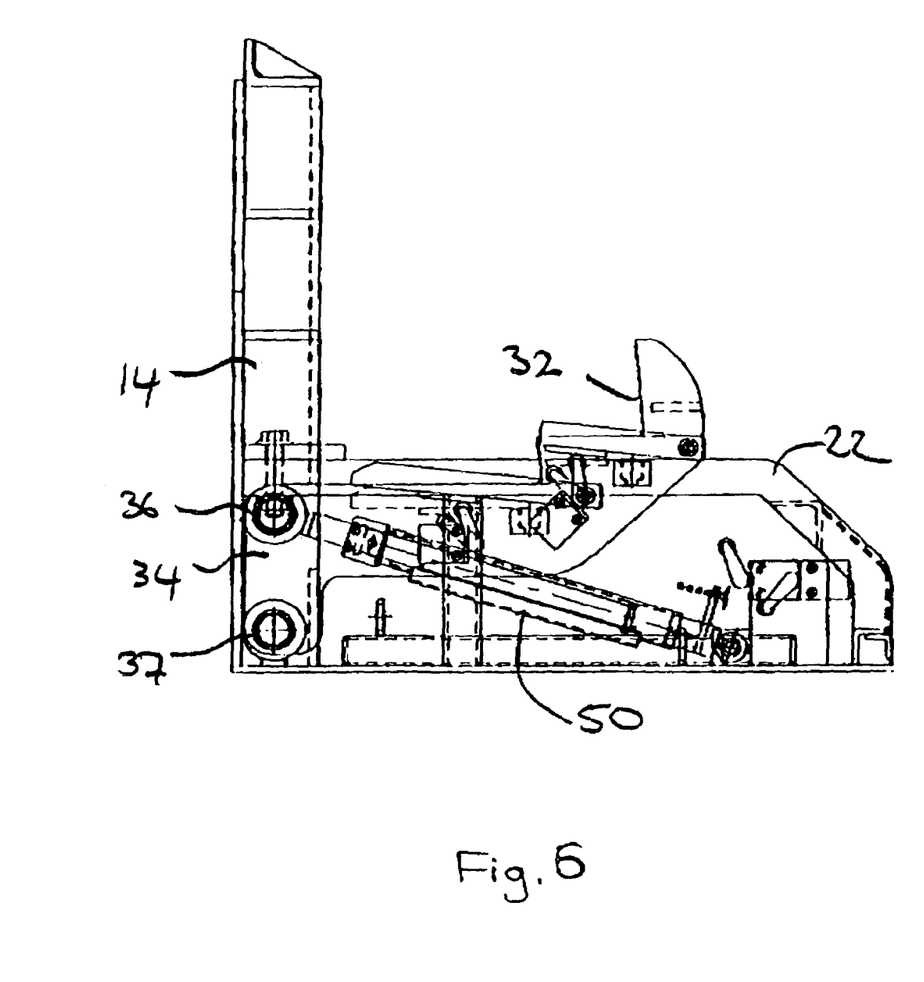
FIG. 6 is a view similar to FIG. 1 showing the restraint in an intermediate position.

As may be seen in FIG. 5, which illustrates the restraint in the fully lowered position, the hook 32 is downwardly inclined and located within the cage provided by the rails 22. The lower rollers 37 are retained within the channels 14 with the upper rollers 36 located within the gaps 70. Upon initial extension of the actuator 50, the line of action from the actuator is towards the rear flange 20 of the channel 14 causing the carriage 30 to rotate and move the hook 32 into a horizontal position as indicated in FIG. 6. In this position, the upper rollers 36 are aligned with respective ones of the channels 14 and further extension of the actuator causes displacement of the carriage 30 along the frame 12 to move the hook 32 into engagement with the ICC bar 42. The limit switches 45 control extension of the actuator 50 upon the signal bars 44 engaging the underside of the ICC 42.

Retraction of the actuator 50 similarly allows the carriage 30 to move vertically down the frame 12 along the channels 14 until the lowermost position is attained, at which time further retraction allows the hook to move to the downwardly inclined position. The retraction of the cylinder is assisted by the mass of the hook 32 as it is cantilevered from the vertical frame 12.

Figure 7:
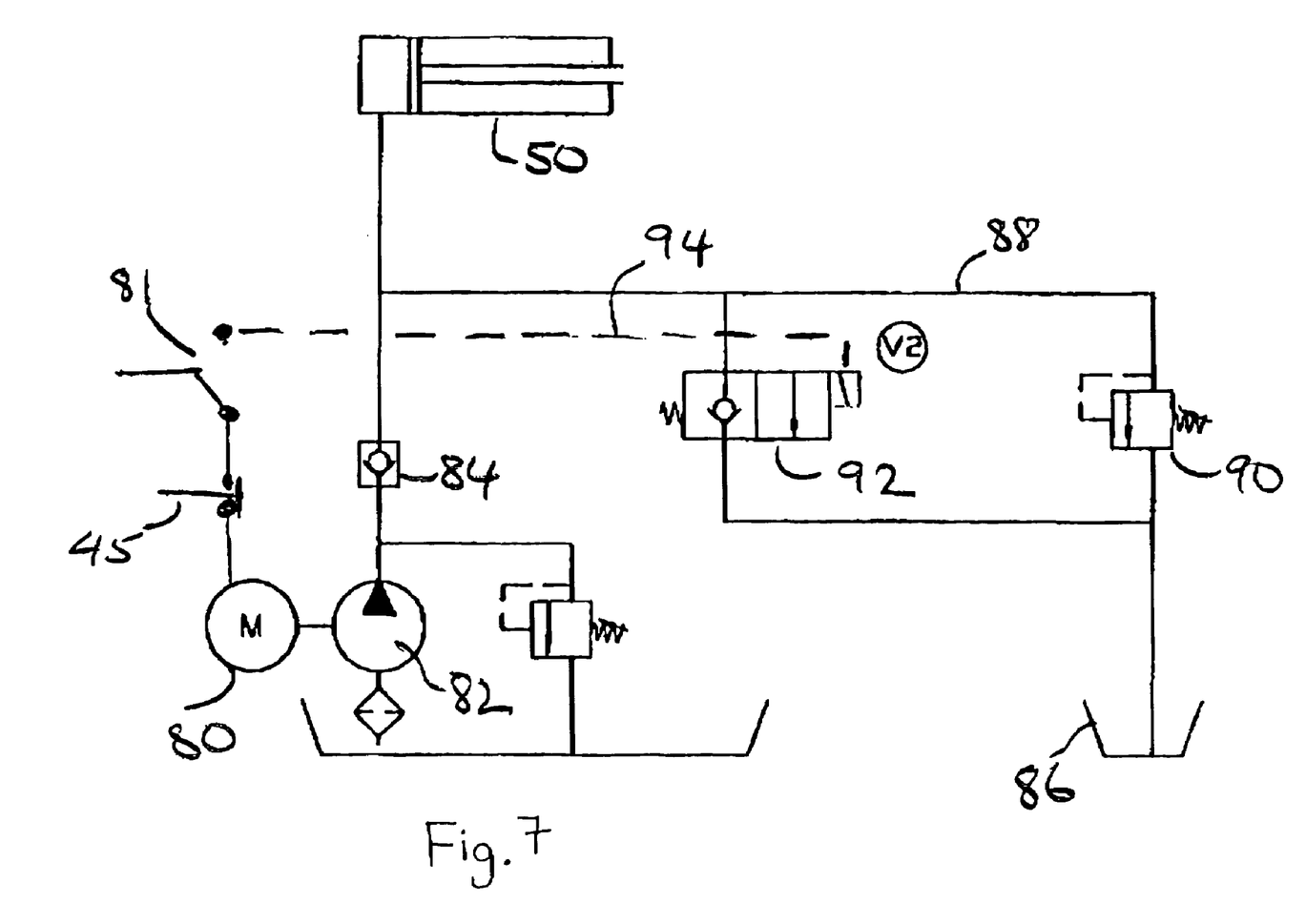
FIG. 7 is a schematic of a hydraulic circuit used in conjunction with the restraint of FIG. 1.

Control of the actuator 50 is provided by the hydraulic circuit shown schematically in FIG. 7. A motor 80 which is supplied with electrical power through a master switch 81 in series with limit switches 45, drives a hydraulic pump 82 which is connected through a check valve 84 to the actuator 50. The actuator 50 is a single acting actuator and is connected to a sump 86 through a drain line 88. A system relief valve 90 is provided in the drain line to maintain pressure up to maximum predetermined level and a lowering valve 92 is provided in parallel to the external relief valve 90. The lowering valve 92 is controlled by an electrical signal 94 to be moveable between the first position in which flow through the valve 92 is prevented and a second position in which the flow through the valve 92 is permitted.

To extend the cylinder 50, the motor 80 is actuated and fluid is supplied to the activator 50. Upon the signal bar 44 engaging the ICC bar 42, the motor is disconnected and the actuator 50 maintained by the external relief valve 90 at the desired position. If the ICC bar 42 moves out of contact with the hook 32, due for example to unloading of the vehicle, the limit switch 45 is again closed causing the motor 80 to deliver further fluid to the actuator 50 and therefore follow the ICC bar's movements.

If, on the other hand, the ICC bar 42 moves downwardly against the hook 32 due to loading of the vehicle, the relief valve 90 will allow fluid to flow through the drain line 88 and avoid over pressuring of the system.

When the cylinder 50 is to be retracted, the switch 81 controlling the motor 80 is opened and a signal provided through the line 94 to move the valve to the alternate position. Fluid is then free to flow to the sump 86 from the actuator 50 under the influence of the mass of the carriage 30.

Figure 8:
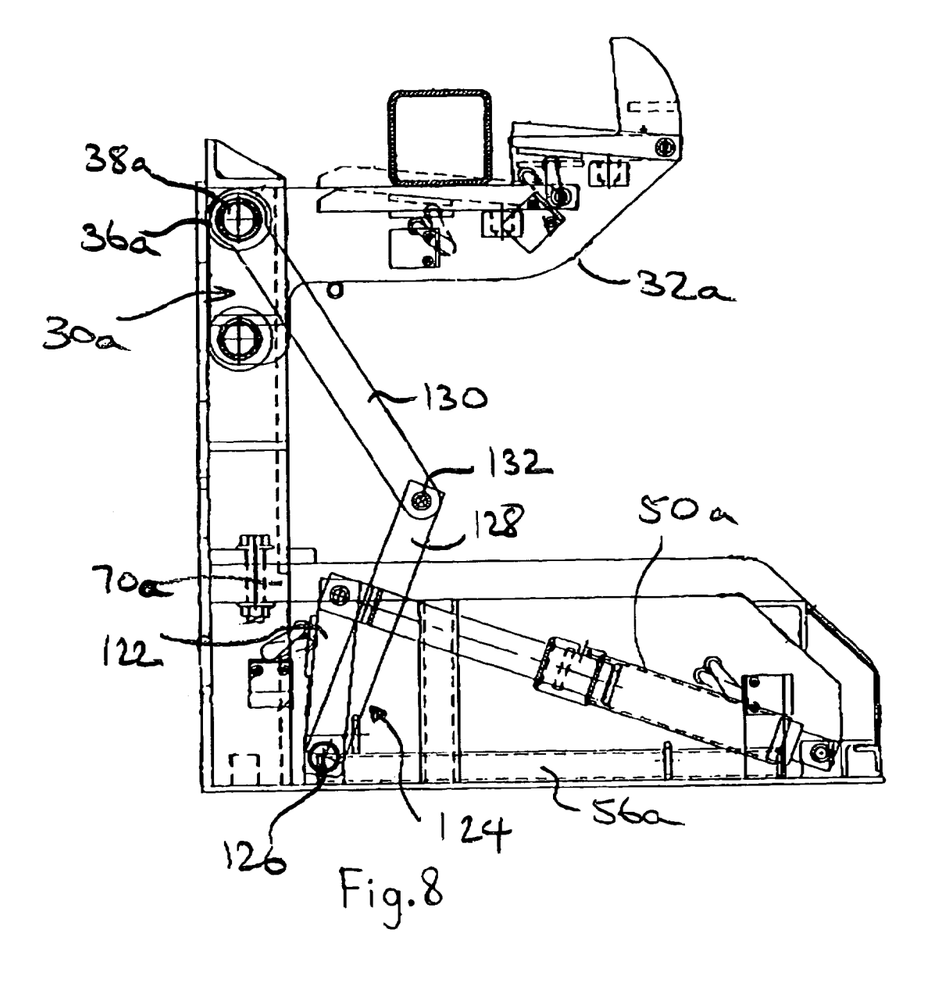
FIG. 8 is a side elevation similar to FIG. 1 of a second embodiment of truck restraint.

In the above example, the actuator 50 is acting directly between the support and the carriage 30. In a second embodiment shown in FIG. 8, a linkage 120 is interposed. In the embodiment of FIG. 8, the actuator 50a is connected to an arm 122 of a bell crank 124 that is rotatably mounted upon a shaft 126 to the frame 56a. The other arm 128 of the bell crank 124 is connected to a drive link 130 through a pin 132 and the drive link 130 is in turn pivotally connected to the axle 38a associated with the upper rollers 36a.

Figure 9:
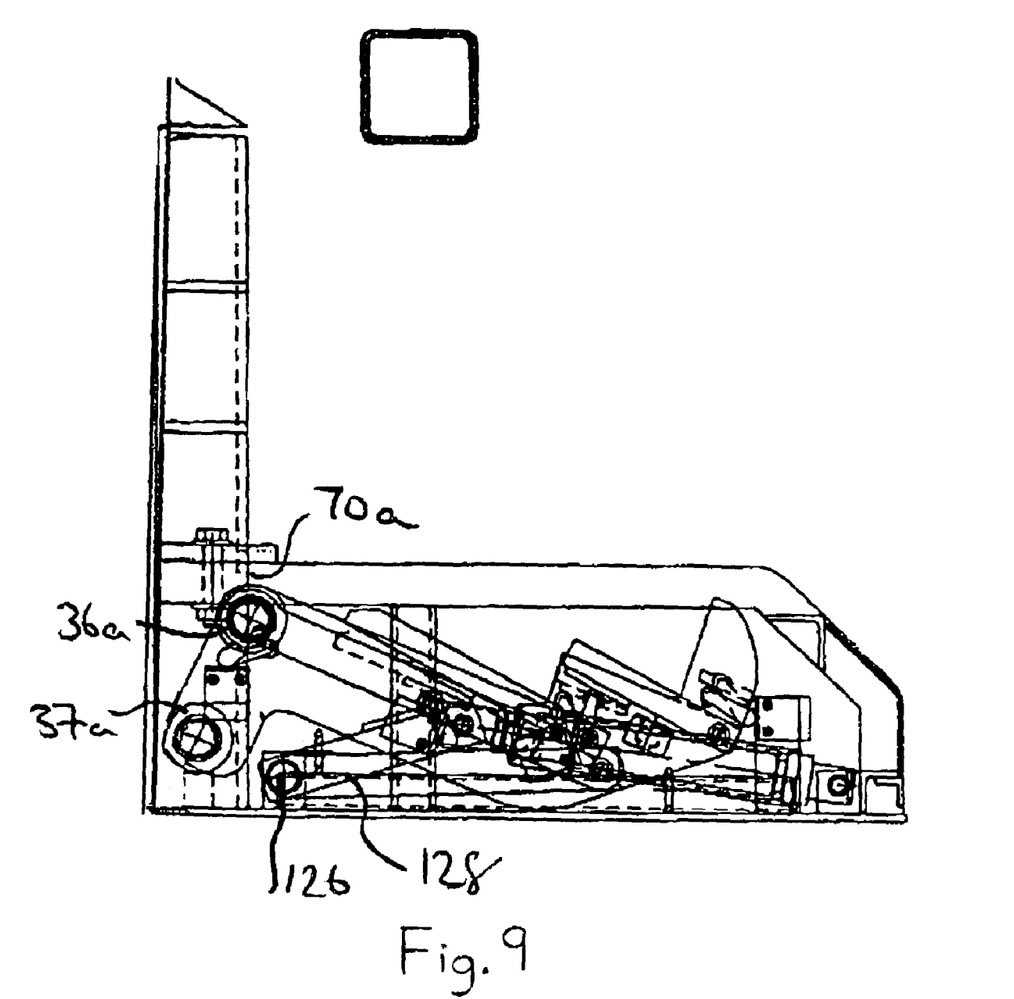
FIG. 9 is a view similar to FIG. 8 showing the restraint in a retracted position.
Figure 10:
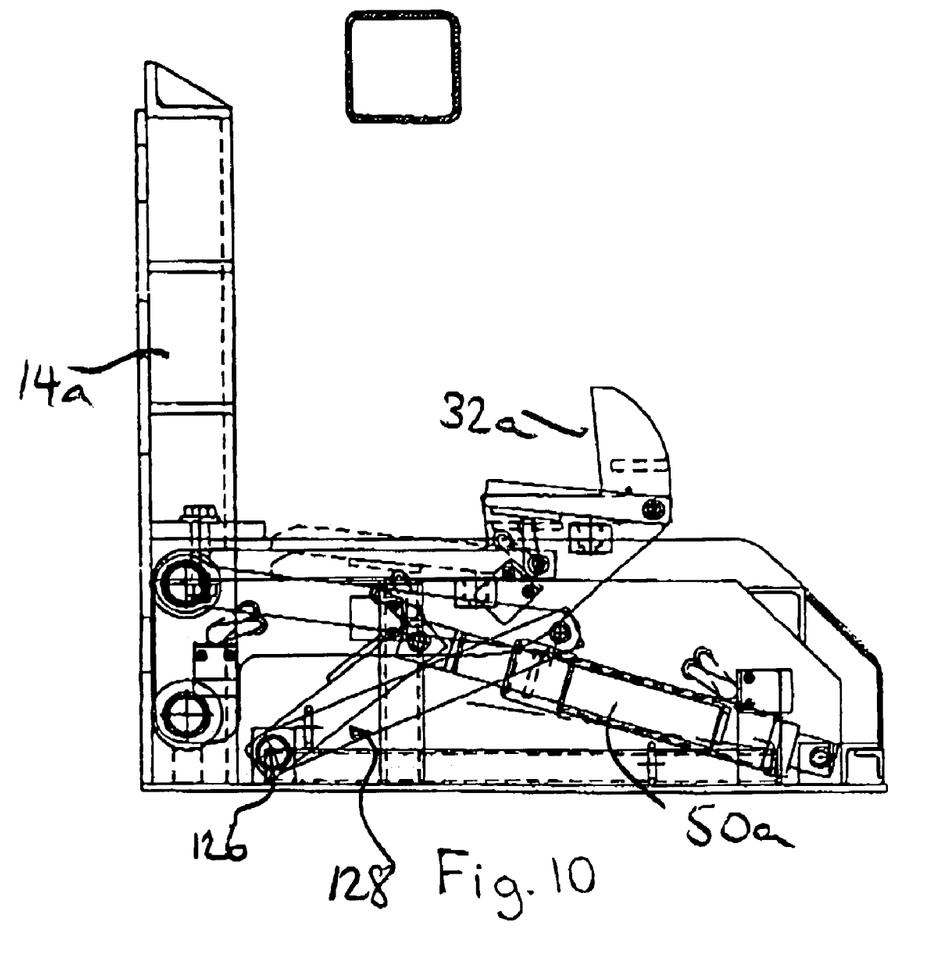
FIG. 10 is a view similar to FIG. 8 showing the restraint in an intermediate position.

In operation, retraction of the actuator 50a from the position shown in FIG. 8 under the influence of the mass of the hook 32a causes rotation of the bell crank in a clockwise direction as viewed in FIG. 8 allowing the carriage 30a to move vertically downwardly. As the carriage 30a reaches the lower most point of its travel, the upper rollers 36a are aligned with the gap 70a in the tracks 14a and allow the hook to move from a horizontal position as shown in FIG. 10 to a downwardly inclined position as shown in FIG. 9. Again, the hook 32a is retracted within the rails 22 to provide protection for the hook and its assemblies.

Figure 11:
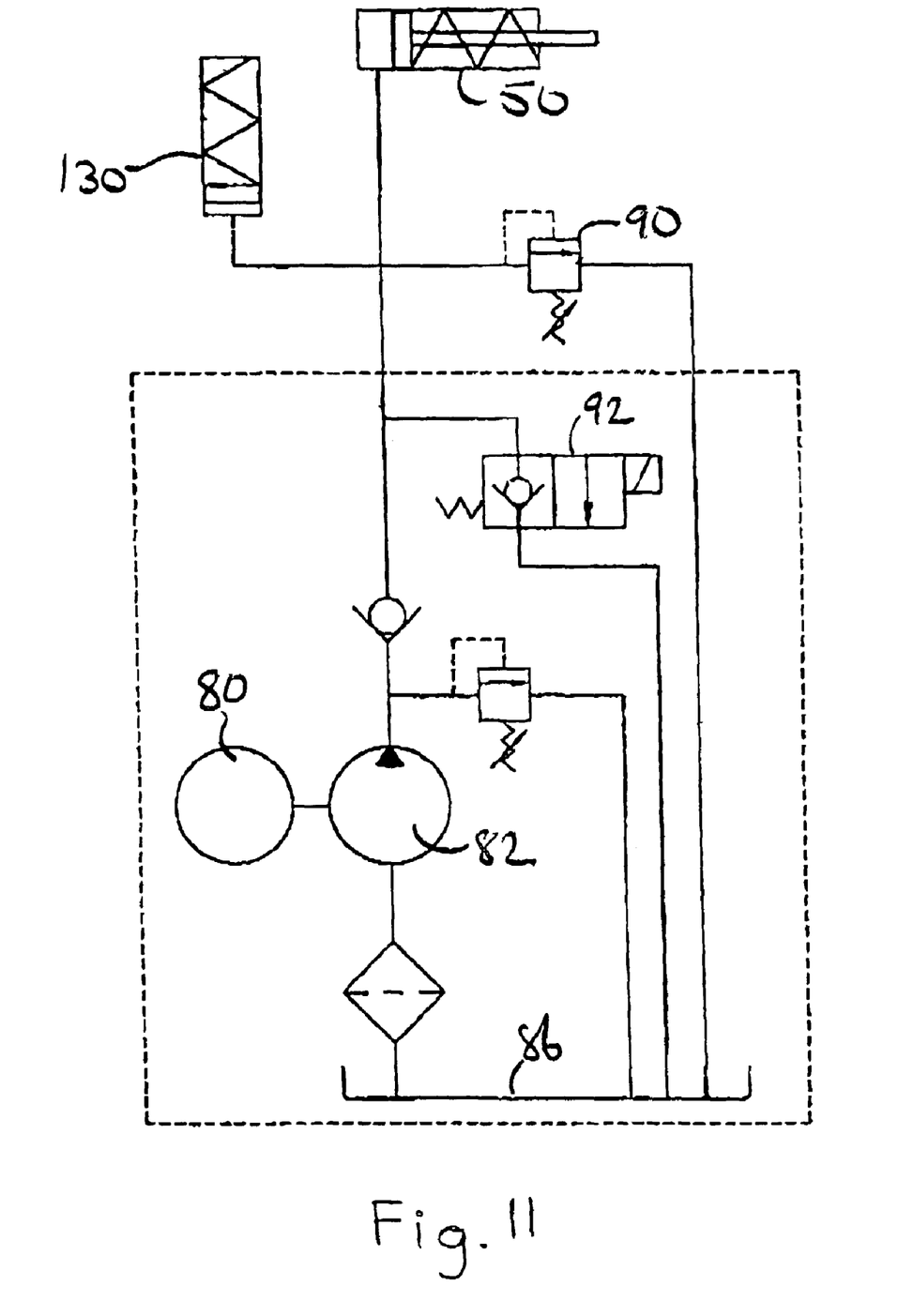
FIG. 11 is a schematic view of an alternative embodiment of hydraulic circuit.

An alternative hydraulic circuit to that shown in FIG. 7 is illustrated in FIG. 11. The components of the circuit of FIG. 11 are similar to those shown in FIG. 7 but an accumulator 130 is included in parallel to the actuator 50. The accumulator 130 is charged with hydraulic fluid once the hook 30 contacts the ICC bar of the truck. In the event that the truck suspension and the ICC bar raises, the charge of fluid in the accumulator causes the hydraulic actuator 50 to accept the fluid from the accumulator 130 and thereby follow the ICC bar upward without the need to activate the pump. The accumulator 130 also provides float from an elevated to a lowered position with further lowering past the original position being accommodated by the relief valve 90.

Figure 12:
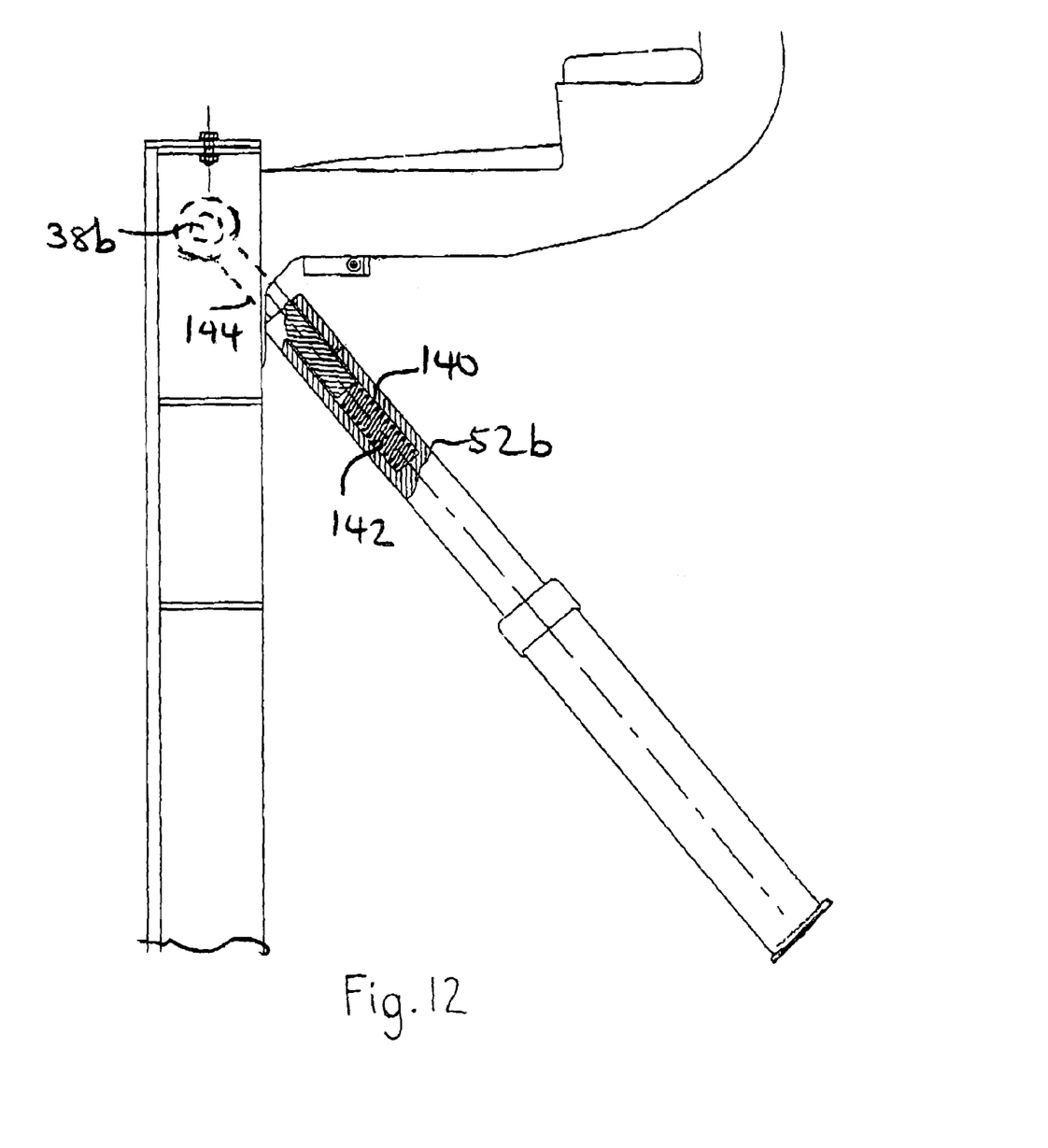
FIG. 12 is a side view partially in section of an embodiment of a hydraulic actuator that may be used with the restraints from FIG. 1 or 8.

A further arrangement for providing float of the hook 32 is shown in FIG. 12 in which the rod end 52b of the actuator 50b is counterbored as indicated at 140 to a specific depth. A compression spring 142 is inserted into the cavity 140 and a pin 144 with a collar to engage the axle 38b is inserted into the bore 140.

In operation, the spring 142 is compressed as the hook 32b contacts the ICC bar 42 and, if the truck suspension and ICC bar is raised, the spring 142 expands and causes the hook 32b to move upward. The hook therefore follows the ICC bar without the need for a hydraulic pump. The spring 142 also permits the hook to float down to the original position with the hydraulic circuit allowing further downward movement if required.

Figure 13:
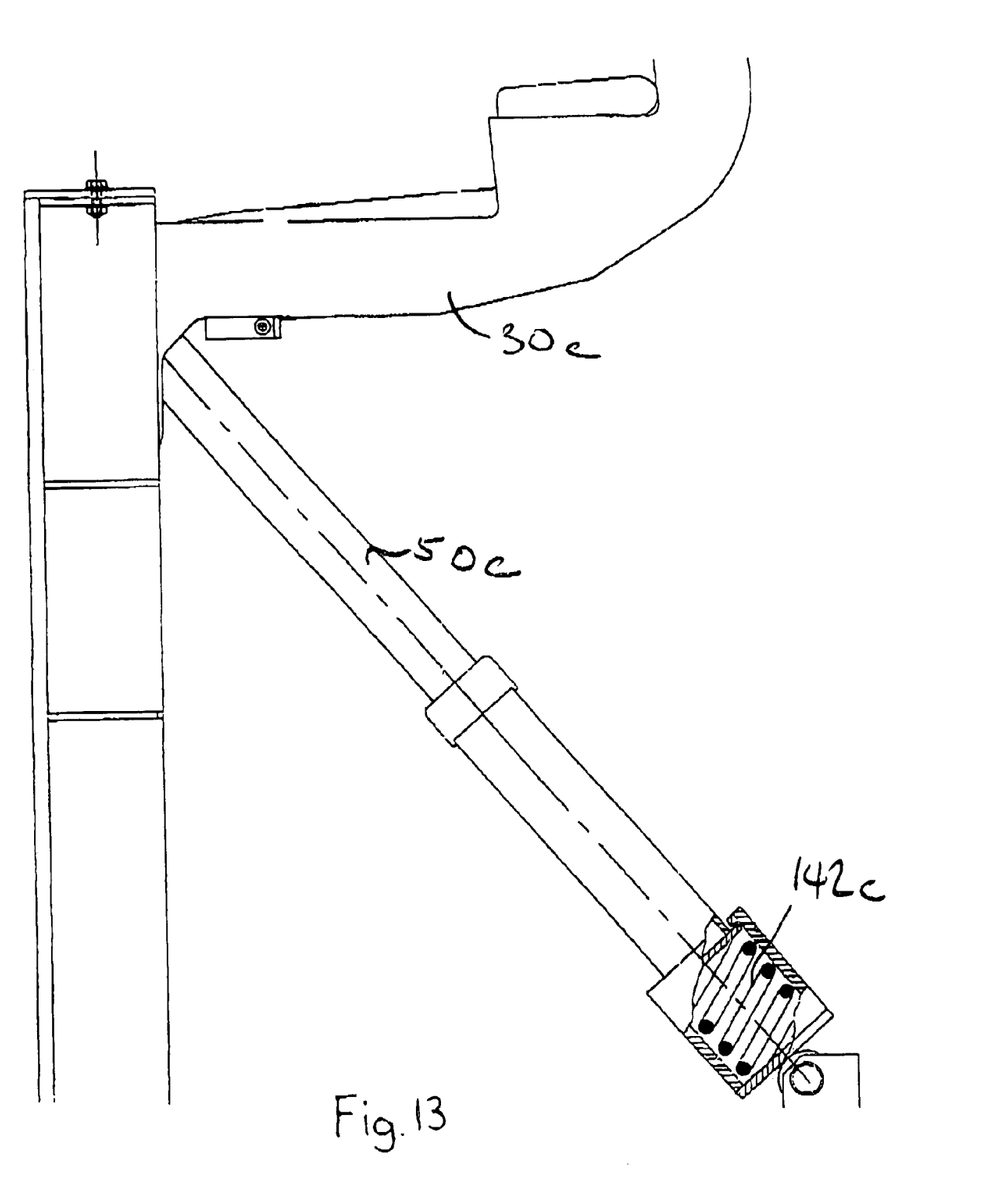
FIG. 13 is a side elevation partly in section with a further embodiment of a hydraulic actuator for use with the restraints of FIG. 1 or 8.

A similar arrangement is shown in FIG. 13 applied to the head end 58c of the cylinder 50c with a spring 142c acting between the attachment point to the frame and the actuator. The spring 142c provides a degree of float to the hook 32c to thereby follow normal movement.

Figure 14:
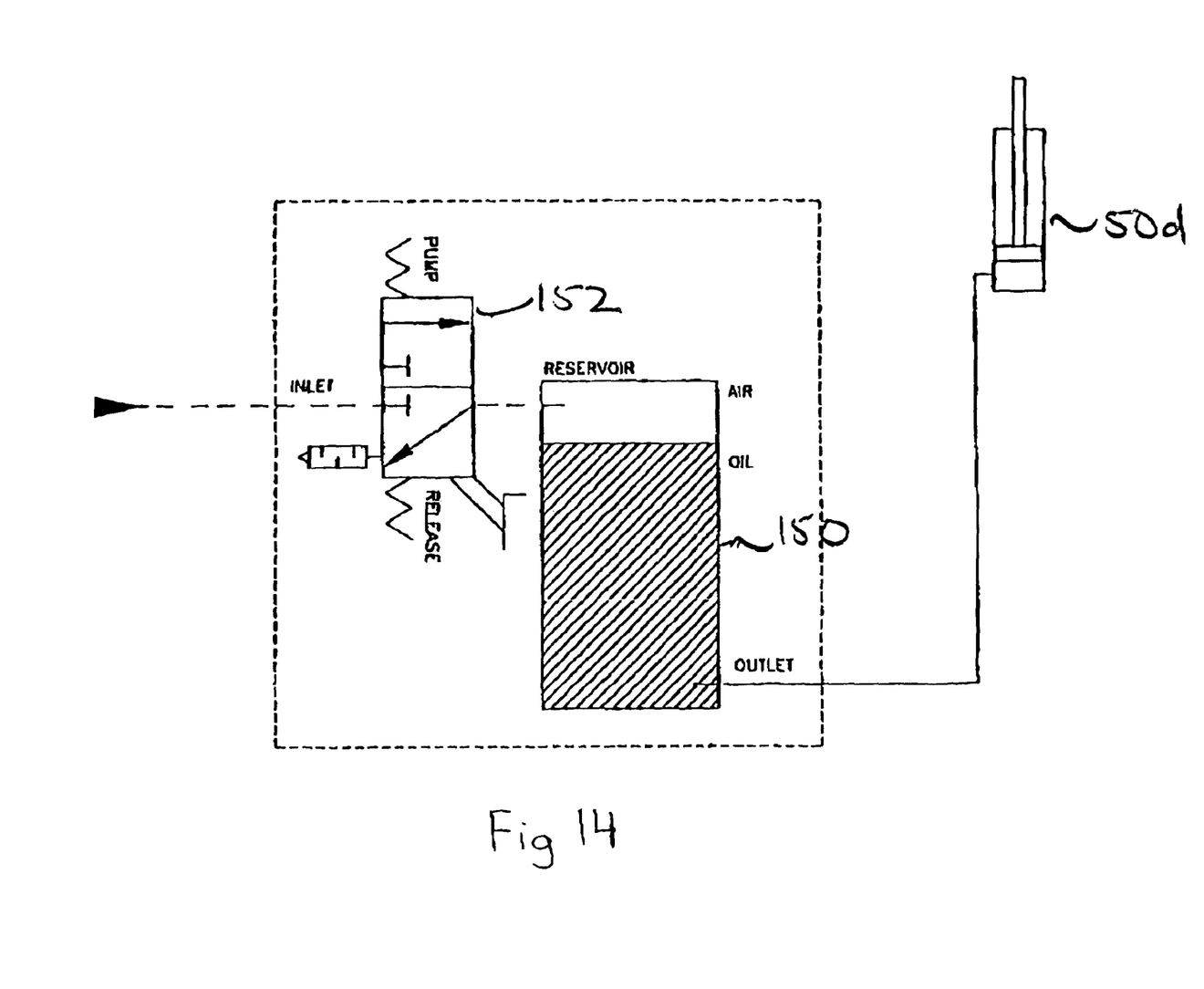
FIG. 14 is a schematic view of a further hydraulic circuit that may be used in conjunction with the restraint of FIG. 1 or 8.

Float may also be introduced into the hydraulic circuit using a hybrid air/hydraulic system as shown schematically in FIG. 14. In the arrangement of FIG. 14, hydraulic fluid is supplied from an accumulator 150 to the hydraulic cylinder 50d. Air under pressure is supplied to the accumulator 150 through a two position valve 152 that may either supply air to the accumulator 150 or vent it to atmosphere. The cylinder 50d may thus be extended by connecting the air supply to the accumulator or retracted by venting the accumulator to atmosphere. The arrangement permits the air supply to be located within a building and thereby avoid condensation issues with the hydraulic circuit located to the exterior of the building. The compressible nature of the air over the hydraulic fluid allows the degree of float in the cylinder 50d to accommodate movement of the ICC bar.

Figure 15:
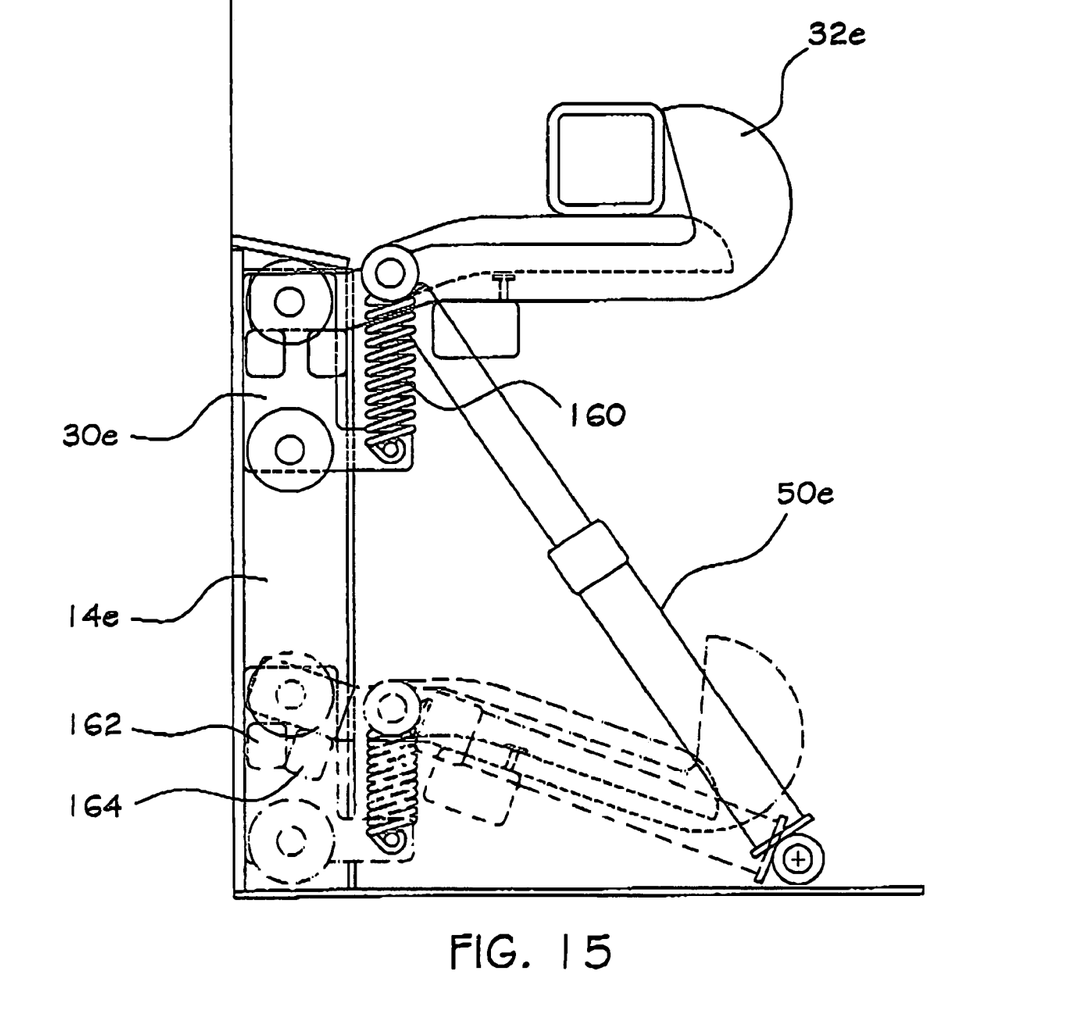
FIG. 15 is a side view of a third embodiment of a truck restraint showing alternate positions thereof.

In each of the above embodiments, relative rotation that allows the tilting of the hook 32 relative to the frame is provided by the gap 70 provided in the front web of channels 14. An alternative arrangement is shown in FIG. 15 in which the hook 32e is pivotally mounted to the carriage 30e. In this embodiment, the tracks 14e do not include the gap 70 and the actuator 50e acts directly on the hook 32e adjacent to but spaced from the pivotal connection of the hook 32e to the carriage 30e. A spring 160 acts between the carriage 30e and the hook 32e and biases the hook 32e into a downwardly inclined position as shown in FIG. 15.

To elevate the carriage 30e, the actuator 50e is extended, causing the spring 160 to extend. A pair of stops 162, 164 are provided to limit movement of the hook and extension of the actuator 50e causes the hook 32e to engage the stop 162. The hook 32e is then positioned in a horizontal orientation and further extension of the actuator 50e causes the carriage 30e to move upwardly along channels 14e to engage the ICC bar. Again, control of the actuator 50e is provided as described above and retraction of the actuator 50e is accomplished using the mass of the hook assembly. Again, however, the hook 32e moves from a downwardly inclined position to a horizontal position prior to movement along the track 14e to thereby maintain the profile at a minimum.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A truck restraint having a carriage with a hook extending therefrom in a longitudinal plane, said carriage and hook moveable in a vertical direction along a track between a first lowered position and a second operative position, an actuator actuator operable to control movement of said carriage along said track between said first and second positions, said actuator being operable with said hook in said first position to cause relative rotation between said carriage and hook and said track about an axis transverse to said longitudinal plane, whereby said hook is moved from a downwardly inclined position to a generally horizontal position, prior to movement of said carriage and hook from said first position.

2. A truck restraint according to claim 1 wherein said carriage is pivotal relative to said track in said first position and said hook moves therewith between said inclined position and said horizontal position.

3. A truck restraint according to claim 2 wherein a discontinuity is provided in said track to permit relative movement between said track and said carriage when said carriage is in said first position.

4. A truck restraint according to claim 2 wherein said actuator is a linear actuator.

5. A truck restraint according to claim 4 wherein said linear actuator acts directly on said carriage to induce movement of said carriage along said track.

6. A truck restraint according to claim 4 wherein said linear actuator acts through a linkage upon said carriage.

7. A truck restraint according to claim 3 wherein said carriage is supported on said track by a pair of vertically spaced rollers and said discontinuity is positioned to permit one of said rollers to move out of said track.

8. A truck restraint according to claim 1 wherein said hook is pivotally connected to said carriage and said actuator controls movement of said hook relative to said carriage.

9. A truck restraint according to claim 8 wherein said hook is biased to said downwardly inclined position.

10. A truck restraint according to claim 9 wherein said actuator acts on said hook against said bias.

11. A truck restraint according to claim 10 wherein said actuator is a linear actuator.

* * * * *